United States Patent
Zhang (10) Patent No.: US 11,991,171 B2
(45) Date of Patent: May 21, 2024

(54) COMMUNICATION METHOD FOR DEVICE, DEVICE AND STORAGE MEDIUM

(71) Applicant: GUANGDONG OPPO MOBILE TELECOMMUNICATIONS CORP., LTD., Dongguan (CN)

(72) Inventor: Jun Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 361 days.

(21) Appl. No.: 17/485,229

(22) Filed: Sep. 24, 2021

(65) Prior Publication Data

US 2022/0014516 A1 Jan. 13, 2022

Related U.S. Application Data

(63) Continuation of application No. PCT/CN2019/079765, filed on Mar. 26, 2019.

(51) Int. Cl.
*H04L 9/40* (2022.01)

(52) U.S. Cl.
CPC .......... *H04L 63/0853* (2013.01); *H04L 63/10* (2013.01)

(58) Field of Classification Search
CPC ... H04L 63/0853; H04L 63/102; H04L 63/10; H04L 63/123; H04L 63/126; H04L 67/1097; H04W 4/70
See application file for complete search history.

(56) References Cited

U.S. PATENT DOCUMENTS 8,544,069 B1 * 9/2013 Subbiah .................. H04L 63/08
726/4
9,959,415 B1 * 5/2018 Rodriguez .......... G06F 21/6236
(Continued)

FOREIGN PATENT DOCUMENTS

CN 102546570 A 7/2012
CN 102915331 A 2/2013
(Continued)

OTHER PUBLICATIONS

Extended European Search Report issued in corresponding International Application No. 19921185.5, dated Feb. 11, 2022, 11 pages.
(Continued)

*Primary Examiner* — Olugbenga O Idowu
(74) *Attorney, Agent, or Firm* — BAYES PLLC (57) ABSTRACT

Disclosed is a communication method for a device, a first cloud platform and a second cloud platform. The communication method includes obtaining, by the first cloud platform, a first access token from the second cloud platform. The first access token is configured for the first cloud platform to access a second resource link of a second device on the second cloud platform, and the second device is connected to the second cloud platform. The method also includes obtaining, by the first cloud platform, the second resource link based on the first access token. The method further includes determining, by the first cloud platform, a first resource link of the second device on the first cloud platform based on the second resource link. The first resource link is configured for a first device connected to the first cloud platform to communicate with the second device.

20 Claims, 6 Drawing Sheets

(56) References Cited

U.S. PATENT DOCUMENTS

| | | | |
|---|---|---|---|
| 10,530,759 B2* | 1/2020 | Alison | ............... H04L 63/0281 |
| 2015/0106899 A1 | 4/2015 | Sheinfeld | |
| 2018/0084085 A1 | 3/2018 | Shanmugasundaram et al. | |
| 2018/0367407 A1 | 12/2018 | Anandam et al. | |
| 2019/0014117 A1* | 1/2019 | Li | ......................... H04L 67/14 |

FOREIGN PATENT DOCUMENTS

| | | | |
|---|---|---|---|
| CN | 105828174 A | 8/2016 | |
| CN | 107995215 A | 5/2018 | |

OTHER PUBLICATIONS

Notice of Allowance issued in corresponding Japanese Application No. 2021-557418, dated Mar. 28, 2023.
International Search Report issued in corresponding International Application No. PCT/CN2019/079765, dated Jul. 4, 2019, 29 pages.
PCT Written Opinion of the International Searching Authority issued in corresponding International Application No. PCT/CN2019/079765, dated Jul. 4, 2019, 11 pages.

* cited by examiner

FIG.10

COMMUNICATION METHOD FOR DEVICE, DEVICE AND STORAGE MEDIUM

CROSS-REFERENCE TO RELATED APPLICATION

This application is a continuation of International Application No. PCT/CN2019/079765, filed on Mar. 26, 2019, the entire contents of which are hereby incorporated by reference.

BACKGROUND

The present disclosure relates to the field of wireless communication technology, and in particular, to a communication method of a device, device and storage medium.

In the related art, a first device and a second device, which are not in a same local network but connected to a same cloud platform, may communicate with each other through the cloud platform. However, as for the communication between two devices that are not connected to the same cloud platform, there is no effective solution yet.

SUMMARY

In order to solve the above technical problem, an embodiment of the present disclosure provides a communication method of a device, device, and storage medium.

In a first aspect, an embodiment of the present disclosure provides a communication method of a device, including obtaining, by a first cloud platform, a first access token from a second cloud platform, the first access token being configured for the first cloud platform to access a second resource link of a second device on the second cloud platform, and the second device being connected to the second cloud platform; obtaining, by the first cloud platform, the second resource link based on the first access token; and determining, by the first cloud platform, a first resource link of the second device on the first cloud platform based on the second resource link, the first resource link being configured for a first device connected to the first cloud platform to communicate with the second device.

In a second aspect, an embodiment of the present disclosure provides a communication method of a device, including sending, by a second cloud platform, a first access token to a first cloud platform, the first access token being configured for the first cloud platform to access a second resource link of a second device on the second cloud platform, and the second resource link being configured for the first device to communicate with the second device, wherein the first device is connected to the first cloud platform, and the second device is connected to the second cloud platform.

In a third aspect, an embodiment of the present disclosure provides a first cloud platform, including a first transceiving unit, configured to obtain a first access token from a second cloud platform, the first access token being configured for the first cloud platform to access a second resource link of a second device on the second cloud platform, and the second device being connected to the second cloud platform; a second transceiving unit, configured to obtain the second resource link based on the first access token; and a first processing unit, configured to determine a first resource link of the second device on the first cloud platform based on the second resource link, the first resource link being configured for a first device connected to the first cloud platform to communicate with the second device.

In a fourth aspect, an embodiment of the present disclosure provides a second cloud platform, including a fourth transceiving unit, configured to send a first access token to a first cloud platform, the first access token being configured for the first cloud platform to access a second resource link of a second device on the second cloud platform, and the second resource link being configured for the first device to communicate with the second device, wherein the first device is connected to the first cloud platform, and the second device is connected to the second cloud platform.

In a fifth aspect, an embodiment of the present disclosure provides a first cloud platform, including a processor and a memory having computer programs stored thereon that are runnable on the processor, wherein when the processor is configured to run the computer programs, a step of the communication method of the device executed by the above terminal device is executed.

In a sixth aspect, an embodiment of the present disclosure provides a second cloud platform, including a processor and a memory having computer programs stored thereon that are runnable on the processor, wherein when the processor is configured to run the computer programs, a step of the communication method of the device executed by the above network device is executed.

In a seventh aspect, an embodiment of the present disclosure provides a storage medium having an executable program stored thereon that, when being executed by a processor, implements the communication method of the device executed by the above terminal device.

In an eighth aspect, an embodiment of the present disclosure provides a storage medium having an executable program stored thereon that, when being executed by a processor, implements the communication method of the device executed by the above network device.

DETAILED DESCRIPTION

In order to understand the feature and technical content of embodiments of the present disclosure in more detail, the implementation of the embodiments of the present disclosure will be described in detail below with reference to the accompanying drawings. The attached drawings are for reference only and are not to limit the embodiments of the present disclosure.

Before describing in detail a communication method of a device provided in the embodiments of the present disclosure, a brief description of related information of the Internet of Things (IoT) will be given first.

Figure 1:
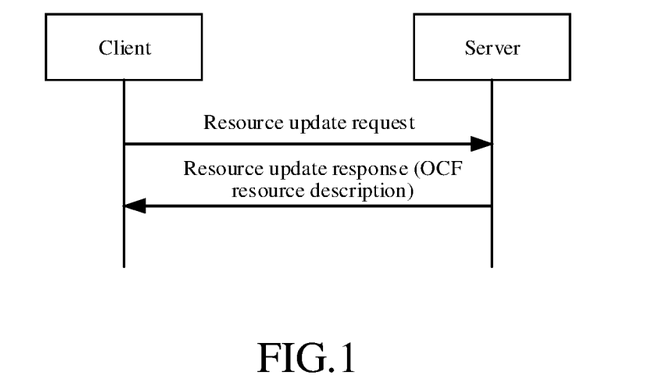
FIG. 1 is a schematic diagram of an interaction mode between a client and a server in the Internet of Things according to the present disclosure.

The Open Connectivity Foundation (OCF) is a technical standards organization for the application layer of the IoT. The OCF develops a Restful service framework for the interconnection of IoT devices. In the OCF Restful service framework, a resource is used to express information such as IoT devices, device functional services, and device status. An entity that provides the resource is an OCF server (hereinafter referred to as server), and an entity that accesses the resource is an OCF client (hereinafter referred to as client). For example, a control terminal that obtains indoor environment status data is the client, and a sensor device that monitors the indoor environment status data is the server. A business interaction between the client and the server is realized by resource operation such as creation, reading, update, deletion or notification of the resource. FIG. 1 illustrates a schematic diagram of the interaction between the client and the server in the IoT, in which the client sends a request message to the server to request the server to operate on the resource; and the server performs the resource operation and returns a request response carrying resource description to the client. In specific implementation, an object that the client requests the server to operate is a Uniform Resource Identifier (URI) of the resource, and a resource operation method is carried in the request. As illustrated in FIG. 1, the server has an environmental temperature resource, the URI of the environmental temperature resource is "/environmentTemperature", and the resource operation method is a resource update method POST. The description of resource includes at least one of resource URI, resource type, resource interface, and resource functional attribute, in which:
1. resource URI: the resource URI is denoted by "href" in the OCF resource description and provides an address of the OCF server resource; a value of "href" is a specific resource URI, and the OCF client accesses the resource of the OCF server through the resource URI; in FIG. 1, the resource URI of the environmental temperature resource is "/environmentTemperature";
2. resource type: the resource type is denoted by "rt" in the OCF resource description, and represents the type of resource; in FIG. 1, the resource type "rt" is "oic.r.temperature", which represents a temperature resource type;
3. resource interface: the resource interface is denoted by "if" in the OCF resource description, and provides a response to resource viewing and resource supporting; in FIG. 1, the resource interface "if" is "oic.if.a", which means a controller interface; and
4. resource attribute: the resource attribute describes attribute information of the resource in the OCF resource description; in FIG. 1, "targetTemperature" represents a target temperature attribute of the temperature resource, "currentTemperature" represents a current temperature attribute of the temperature resource, and "temperatureRange" represents a temperature range attribute of the temperature resource.

The OCF defines a resource discovery resource that all OCF devices must support. The resource discovery resource is represented by "/oic/res". The resource discovery resource provides a device resource discovery function for the OCF device and resource discovery, and the resource discovery resource URI is fixed as "/Oic/res".

In order to express an association relationship between resources, the OCF defines resource links (links). The OCF server may provide its own resources in the form of resource links, so that the OCF client may find its own resources. The content of links is as follows:

```
{
    "anchor": "ocf://dc70373c-1e8d-4fb3-962e-017eaa863989",
    "href": "/myLightSwitch",
    "rt": ["oic.r.switch.binary"],
    "if": ["oic.if.a", "oic.if.baseline"],
    "eps": [{"ep": "coaps://[2001:db8:b::c2e5]:22222"}]
}
```

The content of resource links includes at least one of the following:
- anchor: context URI, which represents the URI of owner resource that contains links;
- href: target URI, that is, the URI of target resource referenced by links;
- rt: a resource type identifier of the target resource;
- if: an interface supported by the target resource; and
- eps: an endpoint (target address and port number) that can access the target resource.

Since the OCF standard protocol uses the CoAP protocol to carry OCF messages in the transport layer, each OCF server needs to have an endpoint, and each OCF server shall be associated with at least one endpoint for sending and receiving messages. The OCF client may access the target resource of the OCF server through the endpoint. An array "eps" in parameters of the links is used to represent the endpoint of the target resource, and a specific endpoint is represented by "ep", that is, the target resource may be accessed through the value of "ep" in the "eps" parameter. For example, in the example of the source link (links) above, the client may access the target resource "/myLightSwitch" through the message endpoint "coaps://[2001:db8:b::c2e5]:22222".

Figure 2:
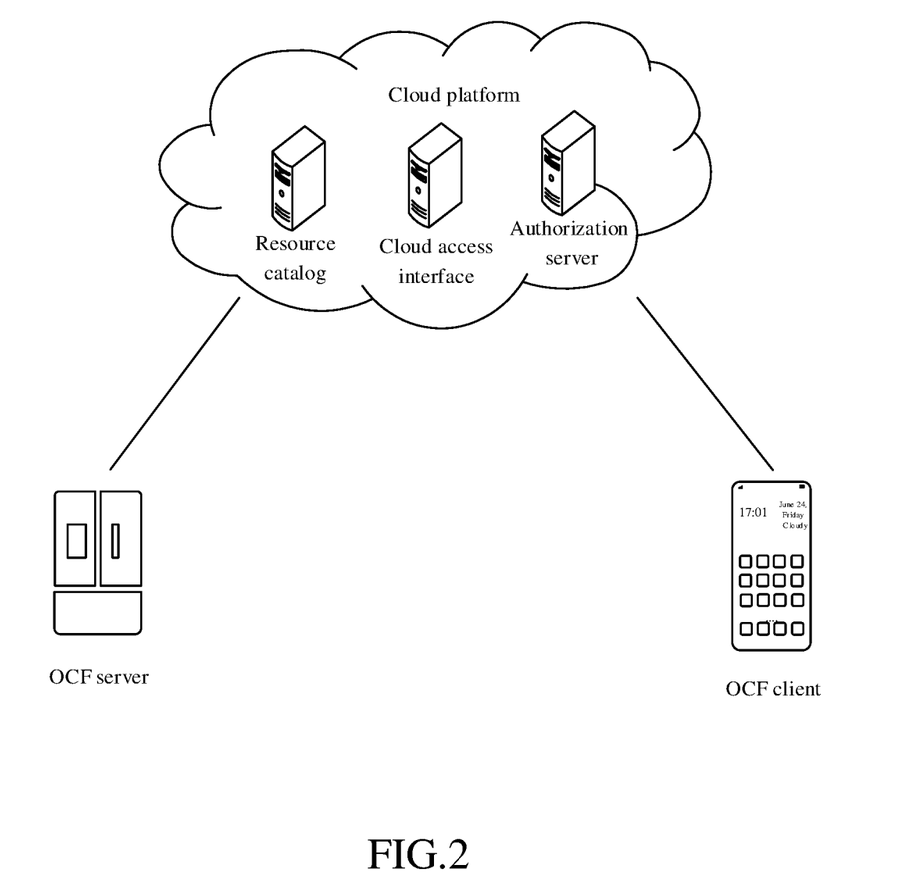
FIG. 2 is a schematic diagram of a deployment architecture of an OCF cloud platform according to the present disclosure.

When the OCF server and the OCF client are not in a same local network, the OCF server and the OCF client communicate with each other through a cloud platform. FIG. 2 illustrates a deployment architecture of an OCF cloud platform. The cloud platform includes three entities: cloud interface, authorization server, and resource catalog. The cloud interface is used for an access management of the server and the client, and a message router of remote communication of the server and the client. The authorization server is used for registration of the server and the client, and verification of access tokens of the server and the client. The resource catalog is used for publishing the links of the server. The client may obtain the resource of a target device by retrieving the resource catalog.

A resource catalog function is defined in an implementation of the cloud platform. After the server is registered with the cloud platform, the server should publish the resources it carries to the resource catalog of the cloud platform according to a predefined resource publishing process. The server and the cloud platform maintain a TLS persistent connection, and the cloud platform uses the TLS persistent connection to route messages between the server and the client. In an embodiment of the present disclosure, the client may also be called as a control terminal, and the server may also be called as an OCF device.

Figure 3:
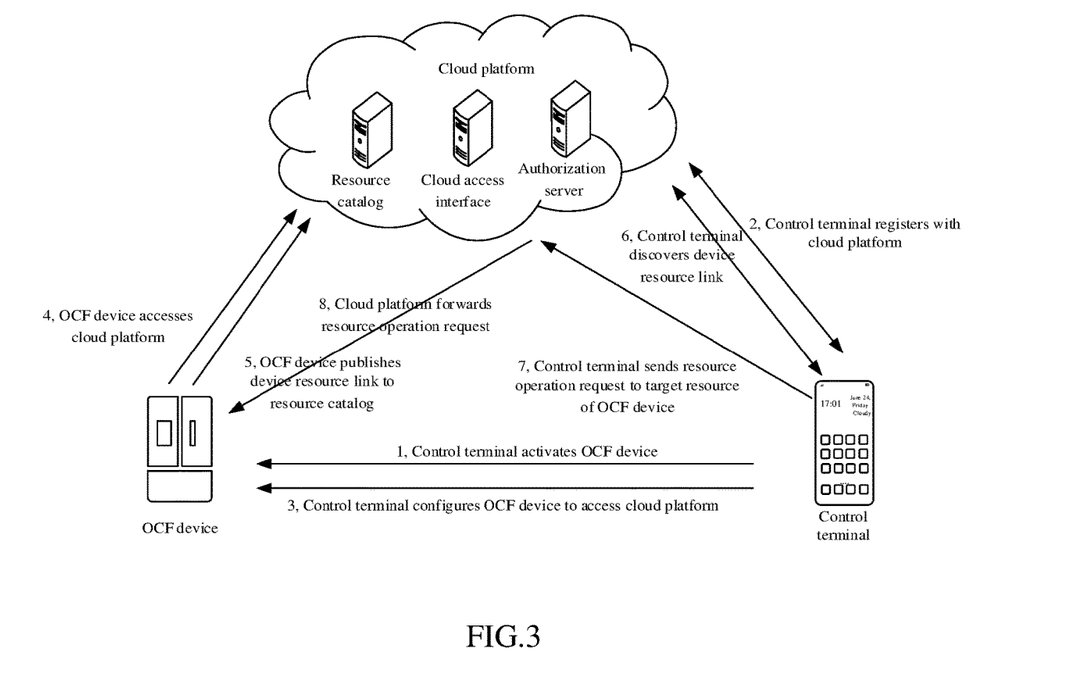
FIG. 3 is a schematic diagram of a communication between a control terminal and an OCF device through a cloud platform according to the present disclosure.

FIG. 3 illustrates a schematic diagram of a communication between the control terminal and the OCF device through the cloud platform, which includes, step 1, the control terminal activates the OCF device and generates a device identifier of the OCF device; step 2, the control terminal registers with the cloud platform, and the cloud platform generates a user identifier and access token for the control terminal; step 3, the control terminal configures the OCF device to access the cloud platform; step 4, the OCF device accesses the cloud platform and maintains a persistent connection with the cloud platform; step 5, the OCF device publishes a resource link (links) carried by itself to the resource catalog of the cloud platform, the resource catalog receives the resource publication of the OCF device, and adds the links published by the device to /oic/res resource; step 6, the control terminal sends a resource discovery request to /oic/res of the cloud platform, and the cloud platform makes a resource discovery response, and returns in a response message the device links published on the resource catalog, and the links include resource information of the OCF device; step 7, the control terminal sends a resource operation request to the target resource of the OCF device; and step 8, the cloud platform forwards the resource operation request to the OCF device, thereby realizing communication between the control terminal and the OCF device.

Figure 4:
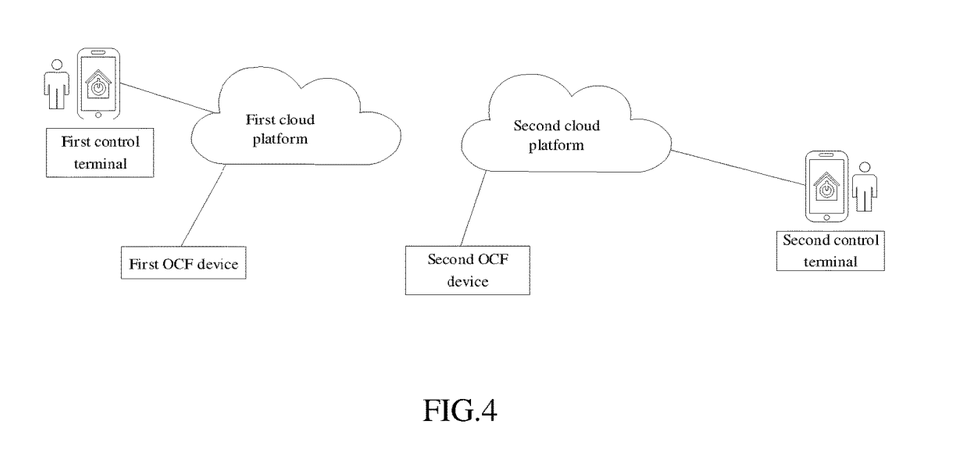
FIG. 4 is a schematic diagram of a structure of a communication system according to an embodiment of the present disclosure.

In the related art, the control terminal and the OCF device that do not belong to the same local network can communicate with each other through the cloud platform. However, the control terminal and the OCF device must be connected to the same cloud platform in order to achieve remote communication, that is, the devices connected to different cloud platforms cannot communicate with each other. FIG. 4 illustrates a schematic diagram of a structure of a communication system according to an embodiment of the present disclosure. As illustrated in FIG. 4, the device includes a first control terminal, a first OCF device, a second control terminal, and a second OCF device. The first control terminal may communicate with the first OCF device through the first cloud platform, and the second control terminal may communicate with the second OCF device through the second cloud platform. However, the first control terminal cannot communicate with the second OCF device, and the second control terminal cannot communicate with the first OCF device, which results in no interoperability between devices, and thus affects user experience.

Based on the above problems, the present disclosure provides a communication method of a device. The communication method of the device in an embodiment of the present disclosure may be applied to various communication systems, such as Internet of Things system, Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, 5G system or the like.

Figure 5:
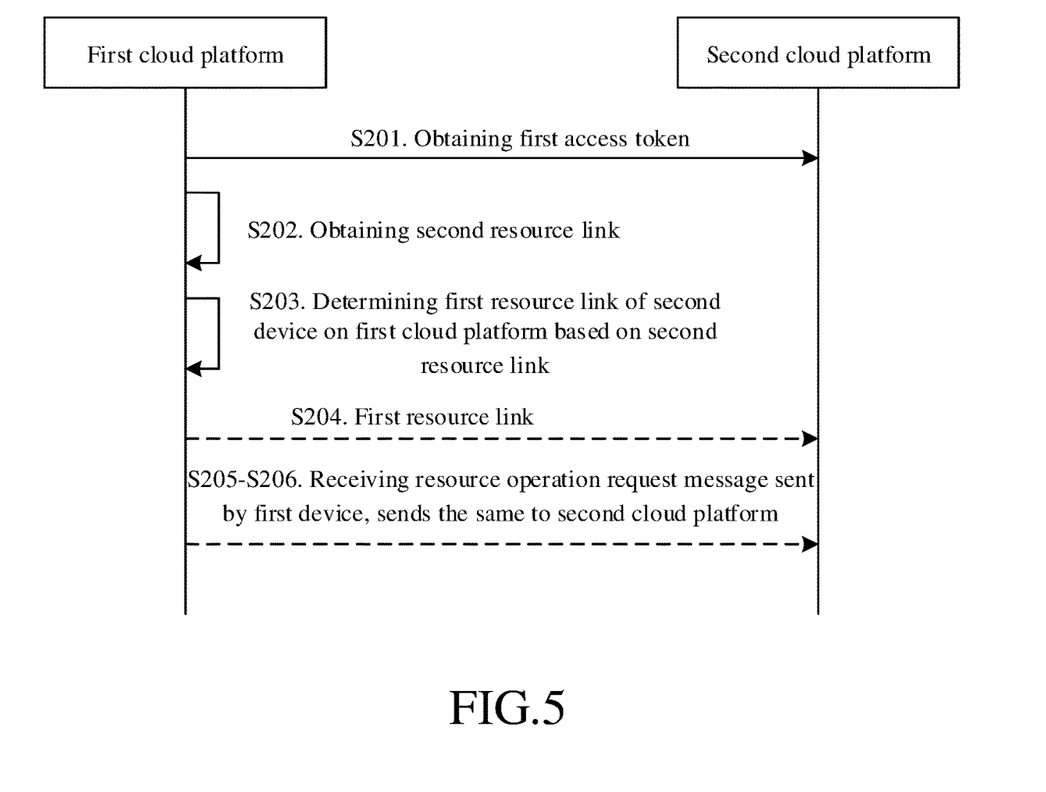
FIG. 5 is a schematic diagram of an exemplary processing flow of a communication method of a device according to an embodiment of the present disclosure.

FIG. 5 illustrates an exemplary processing flow of a communication method of a device according to an embodiment of the present disclosure, which includes the following steps.

In step S201, a first cloud platform obtains a first access token from a second cloud platform.

In an embodiment of the present disclosure, the first cloud platform is connected to a first device, that is, the first cloud platform may communicate with the first device. The second cloud platform is connected to a second device, that is, the second cloud platform may communicate with the second device. Before step S201, a second control terminal activates the second device, and generates a device identifier (device ID) of the second device; the second control terminal performs a control terminal registration with the second cloud platform, and the second cloud platform returns a user identifier and an access token of the second control terminal to the second control terminal; the second control terminal initiates a configuration process for the second device to access the second cloud platform; the second cloud platform maintains an association ship of the access token of the second control terminal with the user identifier of the second control terminal and the device ID of the second device; and the second device publishes links to a resource catalog of the second cloud platform. In some scenarios, a user triggers the first device (first control terminal) to associate user accounts, and the first device (first control terminal) instructs the first cloud platform to request user authorization from the second cloud platform.

In some embodiments, the first cloud platform may obtain the first access token from the second cloud platform through the following steps.

In step a1, the first cloud platform sends a first update request message for a user authorization resource to the second cloud platform.

Here, the first update request message is used for the first cloud platform to request user authorization from the second cloud platform, and the first update request message includes a client identifier of the first cloud platform and a uniform resource identifier URI of a target user authorization resource. A target URI of the first update request message is a user authorization resource URI of the second cloud platform. It can be understood that the first cloud platform sends the first update request message to the user authorization resource URI of the second cloud platform. The resource information requested to be updated by the first update request message includes the client identifier of the first cloud platform. In at least one embodiment, the first update request message may not only include the client identifier of the first cloud platform and the URI of the authorized resource of the target user, but also may include a scope of permissions authorized. For example, the scope of permissions authorized includes reading and writing operation on the device resources connected to the second cloud platform, reading-only operation on the device resources connected to the second cloud platform or the like.

After receiving the first update request message, the second cloud platform redirects the user to an authorization interaction page and asks the user for permission. If the user does not log into the account of the second cloud platform, the permissive user needs to log into the account of the second cloud platform. If the user permits, the second cloud platform verifies the client identifier of the first cloud platform; and after the verification is passed, the second cloud platform sends a first update request response message to the first cloud platform, and the first cloud platform executes step b1.

In step b1, the first cloud platform receives the first update request response message sent by the second cloud platform.

The first update request response message carries an authorization code, and the authorization code is used when the first cloud platform sends the request for obtaining an access token to the second cloud platform, and the second cloud platform uses the authorization code to verify the reliability of the source of the request for obtaining the access token.

In step c1, the first cloud platform sends a second update request message for an access token resource to the second cloud platform.

The second update request message includes a client identifier of the first cloud platform, a client key, and an authorization code. The client identifier of the first cloud platform, client key, and authorization code are resource information requested to be updated by the second update request message; and the target URI of the second update request message is the URI of the access token resource of the second cloud resource.

After receiving the second update request message, the second cloud platform verifies the client identifier of the first cloud platform, client key, and authorization code; and after the verification is passed, the second cloud platform sends a second update request response message to the first cloud platform, and the first cloud platform executes step d1.

In step d1, the first cloud platform receives the second update request response message.

The second update request response message carries the first access token, and the first access token is an access token for the first cloud platform to access links of a resource catalog of the second cloud platform. The first access token is generated by the second cloud platform, and the second cloud platform establishes an association relationship between the first access token and a user identifier of a second control terminal. The second control terminal is connected to the second cloud platform, so that the second control terminal may communicate with the second cloud platform. The first access token is an access token of the second control terminal returned by the second cloud platform to the second control terminal when the second control terminal registers with the second cloud platform before step S201 is executed; or, the first access token may be a new access token. When the first access token is a new access token, the second cloud platform needs to establish an association relationship of the first access token with the user identifier of the second control terminal and the device identifier of the second device. In specific implementation, the second cloud platform may generate the first access token according to the user identifier of the second control terminal, or may generate the first access token according to other factors. The method of generating the first access token by the second cloud platform is not limited in the embodiment of the present disclosure.

In other embodiments, the first cloud platform may obtain the first access token from the second cloud platform through the following steps.

In step a2, the first cloud platform sends a first access request message based on a user authorization address of the second cloud platform.

It may be understood that the first cloud platform sends the first access request message by accessing the user authorization address of the second cloud platform; the first access request message is used by the first cloud platform to request user authorization from the second cloud platform, and the first access request message includes a client identifier of the first cloud platform and a callback address. In at least one embodiment, the first access request message may include not only the client identifier of the first cloud platform and the callback address but also a scope of permissions authorized. For example, the scope of permissions authorized includes reading and writing operation on the device resources connected to the second cloud platform, reading-only operation on the device resources connected to the second cloud platform or the like.

After receiving the first access request message, the second cloud platform redirects the user to the authorization interaction page and asks the user for permission.

If the user does not log into the account of the second cloud platform, the permissive user needs to log into the account of the second cloud platform. If the user permits, the second cloud platform verifies the client identifier of the first cloud platform; and after the verification is passed, the second cloud platform sends the authorization code to the callback address, and the first cloud platform executes step b2. Here, the authorization code is used when the first cloud platform sends the request for obtaining an access token to the second cloud platform, and the second cloud platform uses the authorization code to verify the reliability of the source of the request for obtaining the access token In step b2, the first cloud platform receives the authorization code sent by the second cloud platform.

In step c2, the first cloud platform sends a second access request message based on an access token-obtaining address of the second cloud platform.

It can be understood that the first cloud platform sends the second access request message by accessing the token-obtaining address of the second cloud platform. The second access request message includes a client identifier of the first cloud platform, a client key, and an authorization code.

After receiving the second access request message, the second cloud platform verifies the client identifier of the first cloud platform, the client key, and the authorization code; and after the verification is passed, the second cloud platform sends the first access token to the callback address, and the first cloud platform executes step d2.

In step d2, the first cloud platform receives the first access token sent by the second cloud platform.

The first access token is an access token for the first cloud platform to access links of a resource catalog of the second cloud platform. The first access token is generated by the second cloud platform, and the second cloud platform establishes an association relationship between the first access token and a user identifier of a second control terminal. The second control terminal is connected to the second cloud platform, so that the second control terminal may communicate with the second cloud platform. The first access token is an access token of the second control terminal returned by the second cloud platform to the second control terminal when the second control terminal registers with the second cloud platform before step S201 is executed; or, the first access token may be a new access token. When the first access token is a new access token, the second cloud platform needs to establish an association relationship of the first access token with the user identifier of the second control terminal and the device identifier of the second device. In specific implementation, the second cloud platform may generate the first access token according to the user identifier of the second control terminal, or may generate the first access token according to other factors. The method of generating the first access token by the second cloud platform is not limited in the embodiment of the present disclosure.

In step S202, the first cloud platform obtains a second resource link based on the first access token.

In an embodiment of the present disclosure, after the first cloud platform obtains the first access token and before step S202 is performed, the first cloud platform associates the user with the first access token authorized by the second cloud platform to complete user account association. When the first control terminal (i.e., the first device) queries a device resource link published to a resource catalog of the first cloud platform, the first cloud platform is triggered to obtain the second resource link based on the first access token.

In some embodiments, the first cloud platform sends a resource link request message to the second cloud platform, and the resource link request message carries the first access token. In specific implementation, the first cloud platform queries, from the resource catalog of the second cloud platform, the second resource link published by the device associated with the authorized user. The second cloud platform obtains the second resource link published by the second device according to the device identifier of the second device associated with the first access token; and sends the obtained second resource link to the first cloud platform. At this time, the endpoint information of the second resource link is the endpoint information of the second cloud platform.

In step S203, the first cloud platform determines a first resource link of the second device on the first cloud platform based on the second resource link, the first resource link is used for the first device connected to the first cloud platform to communicate with the second device.

In some embodiments, the first cloud platform adds the second resource link to the /oic/res resource, and replaces the endpoint information of the second cloud platform in the second resource link with the endpoint information of the first cloud platform to obtain the first resource link. In at least one embodiment, the first cloud platform may also establish a mapping correspondence between the endpoint information of the first cloud platform in the first resource link and the endpoint information of the second cloud platform in the second resource link.

After step S203 is performed, the method further includes the following steps.

In step S204, the first cloud platform sends the first resource link to the first device.

In some embodiments, the first device is the first control terminal connected to the first cloud platform.

In step S205, the first cloud platform receives a resource operation request message sent by the first device.

In some embodiments, the resource operation request message is sent by the first device to the endpoint of the first cloud platform.

In step S206, the first cloud platform sends the resource operation request message to the second cloud platform.

In some embodiments, the first cloud platform sends the resource operation request message to the endpoint of the second cloud platform based on the established mapping correspondence between the endpoint information of the first cloud platform in the first resource link and the endpoint information of the second cloud platform in the second resource link. The second cloud platform forwards the resource operation request message to the device resource of the second device.

In the embodiment of the present disclosure, the first device sends the resource operation request message for the second device to the first cloud platform, and the first cloud platform sends the resource operation request message to the endpoint of the second cloud platform according to the mapping correspondence between the endpoint information of the first cloud platform in the first resource link which is maintained by the first cloud platform and the endpoint information of the second cloud platform in the second resource link which is maintained by the second cloud platform, so that the second cloud platform forwards the resource operation request message to the second device, which realizes the communication between the first device and the second device connected to different networks.

Figure 6:
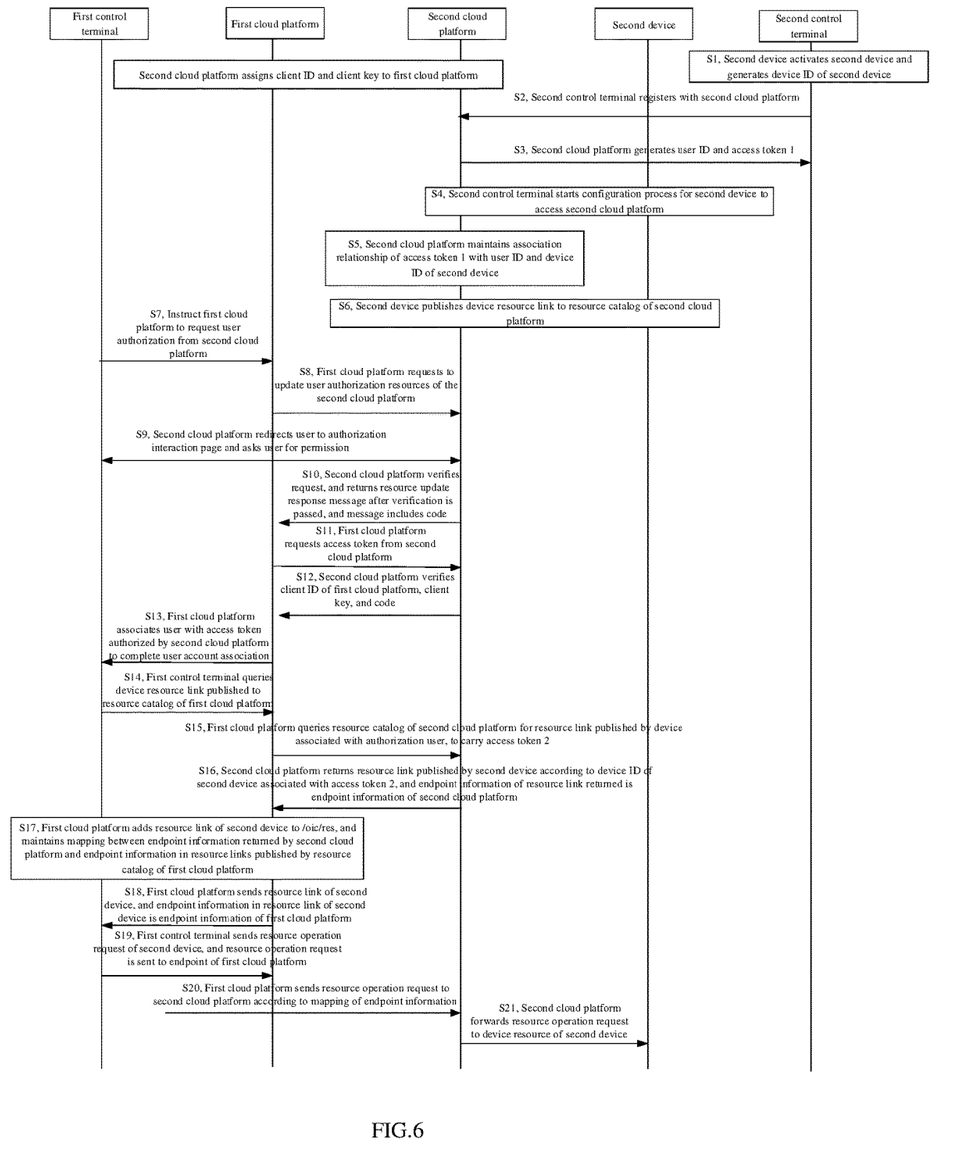
FIG. 6 is a first schematic diagram of a communication processing flow between a first device and a second device according to an embodiment of the present disclosure.

Regarding the implementation manner in which the first cloud platform obtains the first access token from the second cloud platform described in step a1 to step d1 of step S201 in the above embodiment, FIG. 6 illustrates a first schematic diagram of a communication processing flow between the first control terminal (the first device) and the second device, which includes the following steps.

In 51, the second control terminal activates the second device and generates the device identifier of the second device.

In S2, the second control terminal registers with the second cloud platform.

In S3, the second cloud platform returns to the second control terminal the user identifier User ID 1 of the second control terminal and the access token Access Token 1 of the second control terminal.

In S4, the second control terminal starts the configuration process for the second device to access the second cloud platform.

In S5, the second cloud platform maintains the association relationship of Access Token 1 with User ID 1 and the device identifier of the second device.

In S6, the second device publishes the device resource link to the resource catalog of the second cloud platform.

In S7, the user triggers the first control terminal to associate user accounts, and the first control terminal instructs the first cloud platform to request user authorization from the second cloud platform.

In S8, the first cloud platform requests user authorization resources from the second cloud platform.

In specific implementation, the first cloud platform sends an update request to the second cloud platform based on the user authorization resource. The target URI of the update request is the user authorization resource URI of the second cloud platform; the resource information requested to be updated includes the client identifier of the first cloud platform, or the resource information requested to be updated includes the client identifier of the first cloud platform and the scope of permissions authorized. For example, a scope of permissions authorized 1 indicates reading and writing operation on the device resources of the second cloud platform that the user accesses, or authorization range 2 indicates reading-only operation on the device resources of the second cloud platform that the user accesses.

In S9, the second cloud platform redirects the user to the authorization interaction page and asks the user for permission. If the user has not logged into the account of the second cloud platform, the permissive user needs to log into the account.

In S10, if the user permits, the second cloud platform verifies the client identifier of the first cloud platform, and returns the resource update response message to the first cloud platform after the verification is passed, and the message includes the authorization code (code).

In S11, the first cloud platform requests the access token from the second cloud platform.

In specific implementation, the first cloud platform sends an update request to the second cloud platform based on the access token resource. The target URI of the update request is the access token resource URI of the second cloud platform, and the updated resource information includes the client identifier of the first cloud platform, the client key and the code.

In S12, the second cloud platform verifies the client identifier of the first cloud platform, the client key, and the authorization code.

The access token Access Token 2 of the links of the resource catalog of the second cloud platform may be generated by the second cloud platform, and the second cloud platform establishes the association relationship between Access Token 2 and User ID 1. The second control terminal is connected to the second cloud platform, so that the second control terminal can communicate with the second cloud platform. The user identifier User ID 1 of the second control terminal is generated; and Access Token 2 may be the access token Access Token 1 associated with User ID 1, or can be a new access token. When Access Token 2 is a new access token, the second cloud platform needs to associate Access Token 2, the device identifier of the second device and the user identifier of the second control terminal to obtain an association relationship among the Access Token 2, the device identifier of the second device and the user identifier of the second control terminal.

In S13, the first cloud platform associates the user with the access token authorized by the second cloud platform to complete the user account association.

In S14, the first control terminal queries the links published to the resource catalog of the first cloud platform.

In S15, the first cloud platform queries the resource catalog of the second cloud platform for the links published by the device associated with the authorization user, and the query request carries Access Token 2.

In S16, the second cloud platform returns the links published by the second device according to the device identifier of the second device associated with Access Token 2; the endpoint information of the resource links returned here is the endpoint information of the second cloud platform.

In S17, the first cloud platform adds the links of the second device to the /oic/res resource, and maintains the mapping between the endpoint information returned by the second cloud platform and the endpoint information in the links published by the resource catalog of the first cloud platform.

Here, the endpoint information of the resources in the links published by the first cloud platform is the endpoint information of the first cloud platform itself, not the endpoint information of the second cloud platform.

In S18, the first cloud platform sends the links of the second device to the first control terminal, and the endpoint information in the links of the second device is the endpoint information of the first cloud platform.

In S19, the first control terminal sends a resource operation request of the second device to the first cloud platform, and the resource operation request is sent by the first control terminal to an endpoint of the first cloud platform.

In S20, the first cloud platform sends the resource operation request to the second cloud platform according to the mapping of the endpoint information maintained by the first cloud platform.

In S21, the second cloud platform forwards the resource operation request to the device resource of the second device.

Figure 7:
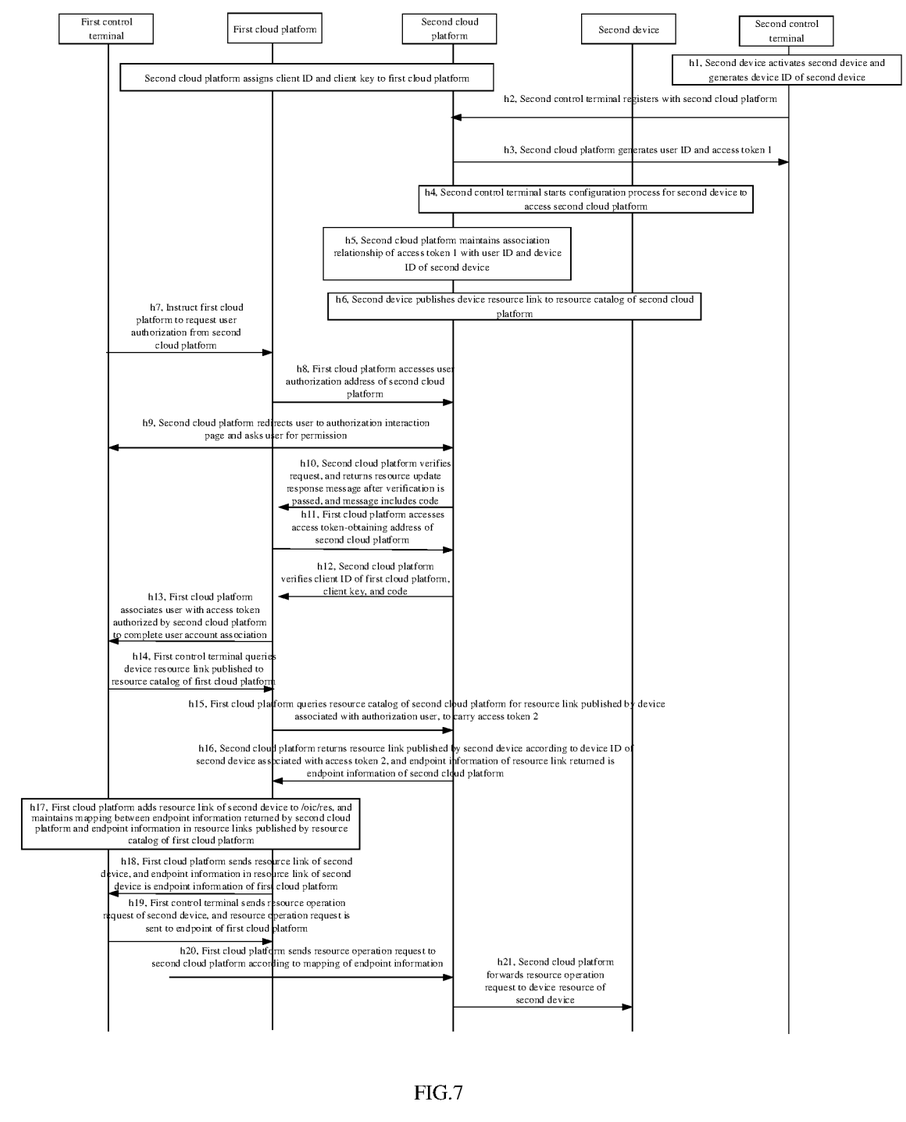
FIG. 7 is a second schematic diagram of a communication processing flow between a first device and a second device according to an embodiment of the present disclosure.

Regarding the implementation manner in which the first cloud platform obtains the first access token from the second cloud platform described in step a2 to step d2 of step S201 in the above embodiment, FIG. 7 illustrates a second schematic diagram of a communication processing flow between the first control terminal (the first device) and the second device, which includes the following steps.

In h1, the second control terminal activates the second device and generates the device identifier of the second device.

In h2, the second control terminal registers with the second cloud platform.

In h3, the second cloud platform returns to the second control terminal the user identifier User ID 1 of the second control terminal and the access token Access Token 1 of the second control terminal.

In h4, the second control terminal starts the configuration process for the second device to access the second cloud platform.

In h5, the second cloud platform maintains the association relationship of Access Token 1 with User ID 1 and the device identifier of the second device.

In h6, the second device publishes the device resource link to the resource catalog of the second cloud platform.

In h7, the user triggers the first control terminal to associate user accounts, and the first control terminal instructs the first cloud platform to request user authorization from the second cloud platform.

In h8, the first cloud platform requests user authorization from the second cloud platform. In specific implementation, the first cloud platform sends the first access request message based on the user authorization address of the second cloud platform, and the first access request message includes the client identifier of the first cloud platform and the callback address. In at least one embodiment, the first access request message includes not only the client identifier of the first cloud platform and the callback address but also the scope of permissions authorized. For example, a scope of permissions authorized 1 represents reading and writing operation on the device resources of the second cloud platform that the user accesses, and a scope of permissions authorized 2 represents reading-only operation on the device resources of the second cloud platform that the user accesses.

In h9, the second cloud platform redirects the user to the authorization interaction page and asks the user for permission. If the user has not logged into the account of the second cloud platform, the permissive user needs to log into the account.

In h10, if the user permits, the second cloud platform verifies the client identifier of the first cloud platform, and returns the resource update response message to the first cloud platform after the verification is passed, and the message includes the authorization code (code).

In h11, the first cloud platform requests the access token from the second cloud platform. In specific implementation, the first cloud platform sends the second access request message based on the access token-obtaining address of the second cloud platform. The second access request message includes the client identifier of the first cloud platform, the client key, and the code.

In h12, the second cloud platform verifies the client identifier of the first cloud platform, the client key, and the authorization code.

The access token Access Token 2 of the links of the resource catalog of the second cloud platform is generated by the second cloud platform, and the second cloud platform establishes the association relationship between Access Token 2 and User ID 1. The second control terminal is connected to the second cloud platform, so that the second control terminal can communicate with the second cloud platform. Access Token 2 may be the access token Access Token 1 associated with User ID 1, or can be a new access token. When Access Token 2 is a new access token, the second cloud platform needs to associate Access Token 2, the device identifier of the second device and the user identifier of the second control terminal to obtain an association relationship among the Access Token 2, the device identifier of the second device and the user identifier of the second control terminal.

In h13, the first cloud platform associates the user with the access token authorized by the second cloud platform to complete the user account association.

In h14, the first control terminal queries the links published to the resource catalog of the first cloud platform.

In h15, the first cloud platform queries the resource catalog of the second cloud platform for the links published by the device associated with the authorization user, and the query request carries Access Token 2.

In h16, the second cloud platform returns the links published by the second device according to the device identifier of the second device associated with Access Token 2; the endpoint information of the resource links returned here is the endpoint information of the second cloud platform.

In h17, the first cloud platform adds the links of the second device to the /oic/res resource, and maintains the mapping between the endpoint information returned by the second cloud platform and the endpoint information in the links published by the resource catalog of the first cloud platform.

Here, the endpoint information of the resources in the links published by the first cloud platform is the endpoint information of the first cloud platform itself, not the endpoint information of the second cloud platform.

In h18, the first cloud platform sends the links of the second device to the first control terminal, and the endpoint information in the links of the second device is the endpoint information of the first cloud platform.

In h19, the first control terminal sends a resource operation request of the second device to the first cloud platform, and the resource operation request is sent by the first control terminal to an endpoint of the first cloud platform.

In h20, the first cloud platform sends the resource operation request to the second cloud platform according to the mapping of the endpoint information maintained by the first cloud platform.

In S21, the second cloud platform forwards the resource operation request to the device resource of the second device.

It should be noted that the numeral of each step in above embodiments of the present disclosure does not represent a limited sequence, and those skilled in the art can change the foregoing sequence without departing from the protection scope of the present disclosure.

Figure 8:
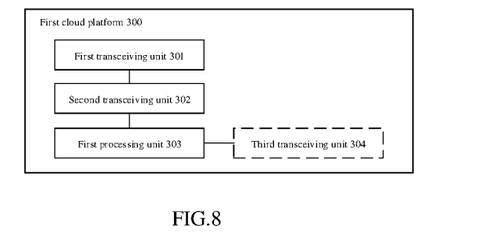
FIG. 8 is a schematic diagram of a structure of a first cloud platform according to an embodiment of the present disclosure.

In order to implement the above communication method of the device, an embodiment of the present disclosure provides a first cloud platform. FIG. 8 illustrates a structure of the first cloud platform 300, which includes a first transceiving unit 301, configured to obtain a first access token from a second cloud platform, the first access token being configured for the first cloud platform to access a second resource link of a second device on the second cloud platform, and the second device being connected to the second cloud platform; a second transceiving unit 302, configured to obtain the second resource link based on the first access token; and a first processing unit 303, configured to determine a first resource link of the second device on the first cloud platform based on the second resource link, the first resource link being configured for a first device connected to the first cloud platform to communicate with the second device.

In some embodiments, the first transceiving unit 301 is configured to: send a first update request message for a user authorization resource to a second cloud platform; receive a first update request response message sent by the second cloud platform; send a second update request message for an access token resource to the second cloud platform based on the first update request response message; and receive a second update request response message sent by the second cloud platform, the second update request response message carrying the first access token.

The first update request message includes a client identifier of the first cloud platform and a URI of a target user authorization resource; or the first update request response message includes a client identifier of the first cloud platform, a URI of a target user authorization resource, and a scope of permissions authorized. The first update request message includes an authorization code. The second update request message includes a client identifier of the first cloud platform, a client key, and an authorization code.

In some other embodiments, the first transceiving unit 301 is configured to: send a first access request message based on a user authorization address of the second cloud platform; receive an authorization code sent by the second cloud platform; send a second access request message based on an access token-obtaining address of the second cloud platform; and receive the first access token sent by the second cloud platform.

The first access request message includes a client identifier of the first cloud platform and a callback address; or the first access request message further includes a client identifier of the first cloud platform, a callback address, and a scope of permissions authorized. The second access request message includes a client identifier of the first cloud platform, a client key, and an authorization code.

In an embodiment of the present disclosure, the second transceiving unit 302 is configured to: send a resource link request message to the second cloud platform, the resource link request message carrying the first access token; and receive the second resource link sent by the second cloud platform, the second resource link being a resource link issued by the second device associated with the second cloud platform according to the first access token.

In an embodiment of the present disclosure, the first processing unit 303 is configured to: replace endpoint information of the second cloud platform in the second resource link with endpoint information of the first cloud platform to obtain the first resource link.

In an embodiment of the present disclosure, the first processing unit 303 is further configured to: establish a mapping correspondence between the endpoint information of the first cloud platform in the first resource link and the endpoint information of the second cloud platform in the second resource link.

In an embodiment of the present disclosure, the first cloud platform further includes a third transceiving unit 304, configured to send the first resource link to the first device.

In an embodiment of the present disclosure, the third transceiving unit 304 is further configured to: receive a resource operation request message sent by the first device; and send the resource operation request message to the second cloud platform.

In an embodiment of the present disclosure, the third transceiving unit 304 is configured to: send the resource operation request message to an endpoint of the second cloud platform based on an established mapping correspondence between endpoint information of the first cloud platform in the first resource link and endpoint information of the second cloud platform in the second resource link.

Figure 9:
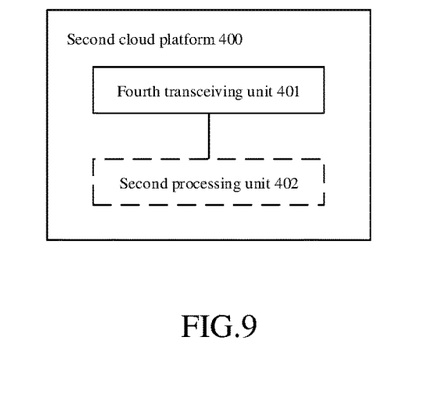
FIG. 9 is a schematic diagram of a structure of a second cloud platform according to an embodiment of the present disclosure.

In order to implement the above communication method of the device, an embodiment of the present disclosure provides a second cloud platform. FIG. 9 illustrates a structure of the first cloud platform 400, which includes a fourth transceiving unit 401, configured to send a first access token to a first cloud platform, the first access token being configured for the first cloud platform to access a second resource link of a second device on the second cloud platform, a first resource link being obtained by replacing, by the first cloud platform, endpoint information for the second resource link, and the first resource link being configured for the first device to communicate with the second device.

The first device is connected to the first cloud platform, and the second device is connected to the second cloud platform.

In an embodiment of the present disclosure, the second cloud platform further includes a second processing unit 402, configured to establish an association relationship of the first access token with a user identifier and a second device identifier.

In an embodiment of the present disclosure, the fourth transceiving unit 401 is configured to: receive a first update request message for a user authorization resource sent by the first cloud platform; send a first update request response message to the first cloud platform; receive a second update request message for an access token resource sent by the first cloud platform; and send a second update request response message to the first cloud platform, the second update request response message carrying the first access token.

The first update request message includes a client identifier of the first cloud platform and a URI of a target user authorization resource; or the first update request response message includes a client identifier of the first cloud platform, a URI of a target user authorization resource, and a scope of permissions authorized. The first update request message includes an authorization code. The second update request message includes a client identifier of the first cloud platform, a client key, and an authorization code.

In some other embodiments, the fourth transceiving unit 401 is configured to: receive a first access request message based on a user authorization address of the second cloud platform; send an authorization code to the first cloud platform; receive a second access request message based on an access token-obtaining address of the second cloud platform; and send the first access token to the first cloud platform.

The first access request message includes a client identifier of the first cloud platform and a callback address; or the first access request message includes a client identifier of the first cloud platform, a callback address and a scope of permissions authorized. The second access request message includes a client identifier of the first cloud platform, a client key, and an authorization code.

In an embodiment of the present disclosure, the fourth transceiving unit 401 is further configured to: receive a resource link request message sent by the first cloud platform, the resource link request message carrying the first access token; send the second resource link to the first cloud platform, the second resource link being a resource link issued by the second device associated with the second cloud platform according to the first access token.

In an embodiment of the present disclosure, the fourth transceiving unit 401 is further configured to: receive a resource operation request message sent by the first cloud platform.

An embodiment of the present disclosure further provides a cloud platform, including a processor and a memory having computer programs stored thereon that are runnable on the processor. When the processor is configured to run the computer programs, a step of the above communication method of the device is executed.

Figure 10:
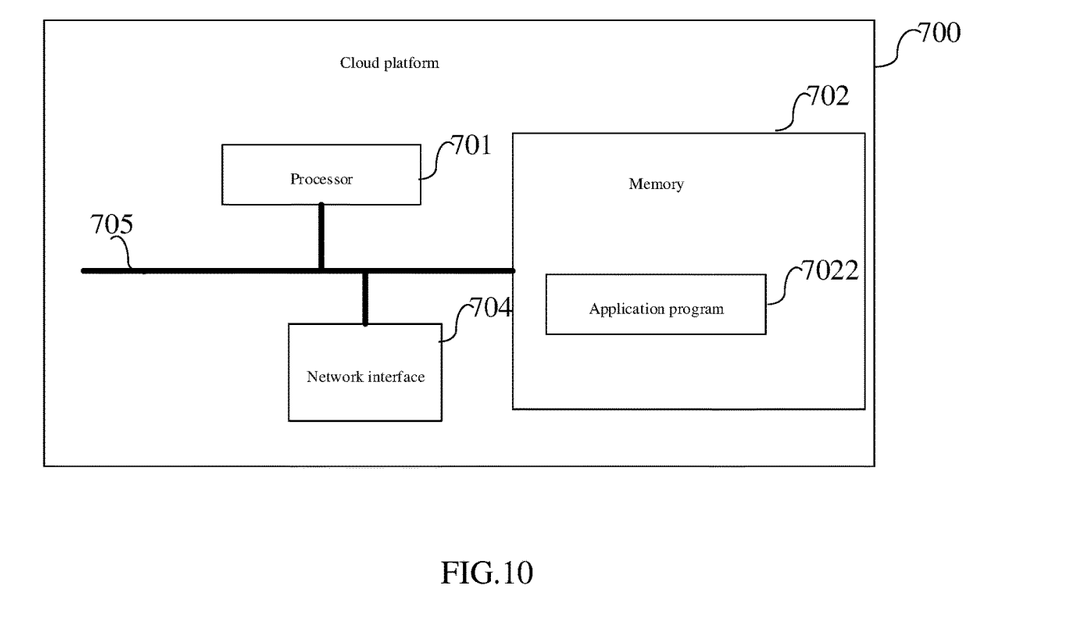
FIG. 10 is a schematic diagram of a hardware structure of a cloud platform according to an embodiment of the present disclosure.

FIG. 10 is a schematic diagram of a hardware structure of a cloud platform according to an embodiment of the present disclosure. A cloud platform 700 includes at least one processor 701, a memory 702, and at least one network interface 704. Various components in the terminal device 700 are coupled together through a bus system 705. It can be understood that the bus system 705 is used to implement connection and communication between these components. In addition to a data bus, the bus system 705 includes a power bus, a control bus, and a status signal bus. However, for the sake of clear description, various buses are labeled as the bus system 705 in FIG. 10.

It can be understood that the memory 702 may be a volatile memory or a non-volatile memory, and may also include both volatile and non-volatile memory. The non-volatile memory may be ROM, programmable read-only memory (PROM), erasable programmable read-only memory (EPROM), electrically erasable programmable read-only memory (EEPROM), ferromagnetic random access memory (FRAM), flash memory, magnetic surface storage, optical disk, or compact disc read-only memory (CD-ROM). The magnetic surface storage may be disk storage or tape storage. The volatile memory may be a random access memory (RAM), which is used as an external cache. By way of exemplary but not restrictive description, many forms of RAM are available, such as static random access memory (SRAM), synchronous static random access memory (SSRAM), dynamic random access Memory (DRAM), synchronous dynamic random access memory (SDRAM), double data rate synchronous dynamic random access memory (DDRSDRAM), enhanced synchronous dynamic random access memory (ESDRAM), synclink dynamic random access memory (SLDRAM), direct rambus random access memory (DRRAM). The memory 702 described in the embodiment of the present disclosure is intended to include, but is not limited to, these and any other suitable types of memory.

The memory 702 in the embodiment of the present disclosure is used to store various types of data to support the operation of the cloud platform 700. Examples of these data include: any computer program used to operate on the terminal device 700, such as an application program 7022.

The program for implementing the method of the embodiment of the present disclosure may be included in the application program 7022.

The method disclosed in the foregoing embodiment of the present disclosure may be applied to the processor 701 or implemented by the processor 701. The processor 701 may be an integrated circuit chip with signal processing capabilities. In the implementation process, the steps of the foregoing method may be completed by an integrated logic circuit of hardware in the processor 701 or instructions in the form of software. The aforementioned processor 701 may be a general-purpose processor, a digital signal processor (DSP), or other programmable logic devices, discrete gate or transistor logic devices, discrete hardware components, and the like. The processor 701 may implement or execute various methods, steps, and logical block diagrams disclosed in the embodiments of the present disclosure. The general-purpose processor may be a microprocessor or any conventional processor or the like. The steps of the method disclosed in the embodiments of the present disclosure can be directly embodied as being executed and completed by a hardware decoding processor, or executed and completed by a combination of hardware and software modules in the decoding processor. The software module may be located in a storage medium, and the storage medium is located in the memory 702. The processor 701 reads the information in the memory 702 and completes the steps of the foregoing method in combination with its hardware.

In an exemplary embodiment, the cloud platform 700 may be implemented by one or more application specific integrated circuits (ASIC), DSP, programmable logic device (PLD), and complex programmable logic device (CPLD), FPGA, general-purpose processor, controller, MCU, MPU, or other electronic components to implement the foregoing method.

An embodiment of the present disclosure also provides a storage medium for storing computer programs.

In at least one embodiment, the storage medium can be applied to the cloud platform in the embodiment of the present disclosure, and the computer program causes a computer to execute the corresponding process in each method of the embodiment of the present disclosure. For brevity, details thereof are not described herein again.

The present disclosure is described with reference to flowchart and/or block diagram of method, device (system), and computer program product according to the embodiments of the present disclosure. It should be understood that each process and/or block in the flowchart and/or block diagram, and the combination of process and/or block in the flowchart and/or block diagram can be implemented by computer program instructions. These computer program instructions can be provided to the processor of a general-purpose computer, a special-purpose computer, an embedded processor, or other programmable data processing equipment to generate a machine, so that the instructions executed by the processor of the computer or other programmable data processing equipment generates a device that implements the functions specified in one or more processes in the flowchart and/or one or more blocks in the block diagram.

These computer program instructions may also be stored in a computer-readable memory that can direct a computer or other programmable data processing equipment to work in a specific manner, so that the instructions stored in the computer-readable memory produce an article including the instruction device. The instruction device implements the functions specified in one or more processes in the flowchart and/or one or more blocks in the block diagram.

These computer program instructions can also be loaded on a computer or other programmable data processing equipment, so that a series of operation steps are executed on the computer or other programmable equipment to produce computer-implemented processing, so that the instructions that are executed on the computer or other programmable equipment provide steps for implementing function steps specified in one or more processes in the flowchart and/or one or more blocks in the block diagram.

The above are only some embodiments of the present disclosure and are not used to limit the protection scope of the present disclosure. Any modification, equivalent replacement and improvement made within the spirit and principle of the present disclosure shall be included in within the protection scope of the present disclosure.

What is claimed is:

1. A first cloud platform, comprising:
   a processor; and
   a memory, configured to store computer programs that, when being executed by the processor, cause the processor to implement a communication method of a device comprising:
   obtaining, by the first cloud platform, a first access token from a second cloud platform, the first access token being configured for the first cloud platform to access a second resource link of a second device on the second cloud platform, and the second device being connected to the second cloud platform;
   obtaining, by the first cloud platform, the second resource link based on the first access token; and
   determining, by the first cloud platform, a first resource link of the second device on the first cloud platform based on the second resource link, the first resource link being configured for a first device connected to the first cloud platform to communicate with the second device,
   publishing, by the first cloud platform, the first resource link on a resource catalog of the first cloud platform.

2. The first cloud platform according to claim 1, wherein obtaining, by the first cloud platform, the first access token from the second cloud platform comprises:
   sending, by the first cloud platform, a first access request message based on a user authorization address of the second cloud platform;
   receiving, by the first cloud platform, an authorization code sent by the second cloud platform;
   sending, by the first cloud platform, a second access request message based on an access token-obtaining address of the second cloud platform; and
   receiving, by the first cloud platform, the first access token sent by the second cloud platform.

3. The first cloud platform according to claim 2, wherein the first access request message comprises:
   a client identifier of the first cloud platform and a callback address.

4. The first cloud platform according to claim 2, wherein the second access request message comprises:
   a client identifier of the first cloud platform, a client key, and an authorization code.

5. The first cloud platform according to claim 2, wherein the first access request message further comprises:
   a scope of permissions authorized.

6. The first cloud platform according to claim 1, wherein obtaining, by the first cloud platform, the second resource link based on the first access token comprises:

sending, by the first cloud platform, a resource link request message to the second cloud platform, the resource link request message carrying the first access token; and receiving, by the first cloud platform, the second resource link sent by the second cloud platform, the second resource link being a resource link issued by the second device associated with the second cloud platform based on the first access token.

7. The first cloud platform according to claim 1, wherein determining, by the first cloud platform, the first resource link of the second device on the first cloud platform based on the second resource link comprises:

replacing, by the first cloud platform, endpoint information of the second cloud platform in the second resource link with endpoint information of the first cloud platform to obtain the first resource link.

8. The first cloud platform according to claim 7, wherein the communication method further comprises:

establishing, by the first cloud platform, a mapping correspondence between the endpoint information of the first cloud platform in the first resource link and the endpoint information of the second cloud platform in the second resource link.

9. A second cloud platform, comprising:
a processor; and
a memory, configured to store computer programs that, when being executed by the processor, cause the processor to implement a communication method of a device comprising:
sending, by the second cloud platform, a first access token to a first cloud platform, the first access token being configured for the first cloud platform to access a second resource link of a second device on the second cloud platform, a first resource link being obtained by replacing, by the first cloud platform, endpoint information for the second resource link, and the first resource link being configured for the first device to communicate with the second device,
wherein the first device is connected to the first cloud platform, and the second device is connected to the second cloud platform.

10. The second cloud platform according to claim 9, wherein sending, by the second cloud platform, the first access token to the first cloud platform comprises:
receiving, by the second cloud platform, a first access request message based on a user authorization address of the second cloud platform;
sending, by the second cloud platform, an authorization code to the first cloud platform;
receiving, by the second cloud platform, a second access request message based on an access token-obtaining address of the second cloud platform; and
sending, by the second cloud platform, the first access token to the first cloud platform.

11. The second cloud platform according to claim 10, wherein the first access request message comprises:
a client identifier of the first cloud platform and a callback address.

12. The second cloud platform according to claim 10, wherein the second access request message comprises:
a client identifier of the first cloud platform, a client key, and an authorization code.

13. The second cloud platform according to claim 10, wherein the first access request message further comprises:
a scope of permissions authorized.

14. A communication method of a device, comprising:
obtaining, by a first cloud platform, a first access token from a second cloud platform, the first access token being configured for the first cloud platform to access a second resource link of a second device on the second cloud platform, and the second device being connected to the second cloud platform;
obtaining, by the first cloud platform, the second resource link based on the first access token; and
determining, by the first cloud platform, a first resource link of the second device on the first cloud platform based on the second resource link, the first resource link being configured for a first device connected to the first cloud platform to communicate with the second device,
publishing, by the first cloud platform, the first resource link on a resource catalog of the first cloud platform.

15. The method according to claim 14, wherein obtaining, by the first cloud platform, the first access token from the second cloud platform comprises:
sending, by the first cloud platform, a first access request message based on a user authorization address of the second cloud platform;
receiving, by the first cloud platform, an authorization code sent by the second cloud platform;
sending, by the first cloud platform, a second access request message based on an access token-obtaining address of the second cloud platform; and
receiving, by the first cloud platform, the first access token sent by the second cloud platform.

16. The method according to claim 15, wherein the first access request message comprises:
a client identifier of the first cloud platform and a callback address.

17. The method according to claim 15, wherein the second access request message comprises:
a client identifier of the first cloud platform, a client key, and an authorization code.

18. The method according to claim 14, wherein obtaining, by the first cloud platform, the second resource link based on the first access token comprises:
sending, by the first cloud platform, a resource link request message to the second cloud platform, the resource link request message carrying the first access token; and
receiving, by the first cloud platform, the second resource link sent by the second cloud platform, the second resource link being a resource link issued by the second device associated with the second cloud platform based on the first access token.

19. The method according to claim 14, wherein determining, by the first cloud platform, the first resource link of the second device on the first cloud platform based on the second resource link comprises:
replacing, by the first cloud platform, endpoint information of the second cloud platform in the second resource link with endpoint information of the first cloud platform to obtain the first resource link.

20. The method according to claim 19, further comprising:
establishing, by the first cloud platform, a mapping correspondence between the endpoint information of the first cloud platform in the first resource link and the endpoint information of the second cloud platform in the second resource link.

* * * * *